(12) United States Patent
Wintrich et al.

(10) Patent No.: US 12,534,408 B2
(45) Date of Patent: Jan. 27, 2026

(54) MECHANICAL PROPERTIES OF WATERPROOFED GYPSUM BOARDS WITH POLYDIMETHYLSILOXANES

(71) Applicant: Knauf Gips KG, Iphofen (DE)

(72) Inventors: Hans Wintrich, Castell (DE); Janos Lotz, Gelnhausen (DE); Lothar Scheller, Iphofen (DE); Simon Gröninger, Markt Taschendorf (DE)

(73) Assignee: KNAUF GIPS KG, Iphofen (DE)

( * ) Notice: Subject to any disclaimer, the term of this patent is extended or adjusted under 35 U.S.C. 154(b) by 613 days.

(21) Appl. No.: 17/294,768

(22) PCT Filed: Nov. 19, 2018

(86) PCT No.: PCT/EP2018/000517
§ 371 (c)(1),
(2) Date: May 18, 2021

(87) PCT Pub. No.: WO2020/104000
PCT Pub. Date: May 28, 2020

(65) Prior Publication Data
US 2021/0403380 A1     Dec. 30, 2021

(51) Int. Cl.
| C04B 28/14 | (2006.01) |
|---|---|
| C04B 22/06 | (2006.01) |
| C04B 22/14 | (2006.01) |
| C04B 24/42 | (2006.01) |
| C04B 103/65 | (2006.01) |
| C04B 111/00 | (2006.01) |
| C04B 111/27 | (2006.01) |

(52) U.S. Cl.
CPC ............ *C04B 28/14* (2013.01); *C04B 22/066* (2013.01); *C04B 22/142* (2013.01); *C04B 24/42* (2013.01); *C04B 2103/65* (2013.01); *C04B 2111/00094* (2013.01); *C04B 2111/0062* (2013.01); *C04B 2111/27* (2013.01)

(58) Field of Classification Search
CPC ..... C04B 28/14; C04B 22/066; C04B 22/142; C04B 24/42; C04B 2103/65; C04B 2111/00094; C04B 2111/0062; C04B 2111/27
See application file for complete search history.

(56) References Cited

U.S. PATENT DOCUMENTS

| 7,273,579 B2 * | 9/2007 | Miller ................. C04B 28/14 264/333 |
|---|---|---|
| 2008/0190062 A1 * | 8/2008 | Engbrecht ............. E04C 2/043 442/79 |
| 2010/0075166 A1 * | 3/2010 | Gilley ................. C04B 28/14 428/521 |
| 2018/0346383 A1 * | 12/2018 | Bailey ................. C04B 28/14 |

FOREIGN PATENT DOCUMENTS

| CN | 105174760 A | * | 12/2015 | |
|---|---|---|---|---|
| CN | 108290791 A | * | 7/2018 | ............. C04B 28/14 |
| JP | H11071162 A | | 3/1999 | |
| WO | 81/01702 A1 | | 6/1981 | |
| WO | 99/08979 A1 | | 2/1999 | |
| WO | 2006/020369 A2 | | 2/2006 | |
| WO | 2007/018705 A2 | | 2/2007 | |
| WO | 2008/100777 A2 | | 8/2008 | |
| WO | 2013/020173 A1 | | 2/2013 | |
| WO | 2013/122974 A1 | | 8/2013 | |

OTHER PUBLICATIONS

English Machine Translation of CN 108290791 (Year: 2018).*
English machine translation of CN 105174760. (Year: 2015).*
International Search Report and Written Opinion received in PCT/EP2018/000517, mailed Aug. 12, 2019.

* cited by examiner

*Primary Examiner* — Angela C Scott
(74) *Attorney, Agent, or Firm* — Greer, Burns & Crain, Ltd

(57) ABSTRACT

A waterproofed gypsum board and associated method are provided, featuring the use of a mixture of magnesium oxide and a gypsum crystal modifier for improving the resistance to sagging of the waterproofed gypsum board, in particular, in moist and warm climatic conditions.

13 Claims, 1 Drawing Sheet

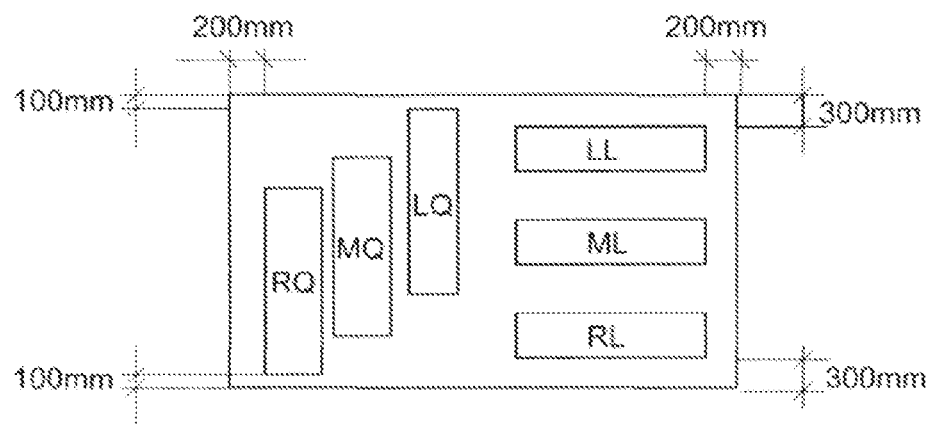

MECHANICAL PROPERTIES OF WATERPROOFED GYPSUM BOARDS WITH POLYDIMETHYLSILOXANES

BACKGROUND

The invention relates to waterproofed gypsum boards and a method for producing gypsum boards of this kind. In particular, the invention relates to gypsum boards that are waterproofed with the aid of siloxanes and that contain magnesium oxide as catalyst for the polymerisation of the siloxane.

Waterproofed gypsum boards are prior art. Construction boards of this kind are made water-repellent by means of a hydrophobing agent. Various hydrophobing agents are known from the prior art. A group of hydrophobing agents frequently used for this purpose comprises silicone oils, or what are known as siloxanes. Siloxanes are added to gypsum slurry in the production of gypsum boards and cause a mass waterproofing of the gypsum board. During the setting process, the siloxanes polymerise and thus form, as a general assumption, a polysiloxane network in the gypsum board. Document WO 2006/020369 A2 describes that the polymerisation can be catalysed by magnesium oxide. Consequently, the amount of siloxane used to produce a defined waterproofing can be reduced.

The use of magnesium oxide as catalyst for the siloxane polymerisation, however, has a serious disadvantage. The boards waterproofed in this way are particularly susceptible to gypsum creep. A significant quality feature in the production of gypsum boards, in particular in the case of gypsum plasterboard, is the mechanical stability or the resistance of the boards to sagging on account of gypsum creep, in particular in the case of horizontal fastening. When the boards are fastened horizontally, for example on ceiling profiles running parallel to one another and at a distance from one another, the force of gravity over time causes a re-crystallisation of the gypsum in the boards. Sagging of the board occurs in the regions not fixed to the profiles. This phenomenon is particularly pronounced in moist and warm climatic conditions.

It is known, in the production of gypsum boards, to add additives to the gypsum slurry that improve the resistance to sagging of gypsum boards. A known example of these additives is trisodium metaphosphate (STMP=sodium trimetaphosphate), see for example WO 99/08979 A2. It is known from EP 1 910 243 B1, however, that STMP must be used with caution and that STMP with certain conventional additives, for example pH-enhancing additives, can lead to a significant delay in the setting of the slurry. In those cases STMP additionally loses its ability to protect the gypsum board against gypsum creep.

SUMMARY

The object of the invention thus lies in providing waterproofed gypsum boards that are less susceptible to gypsum creep, in particular under moist and warm climatic conditions. In addition, a method for producing waterproofed gypsum boards of this kind is to be provided.

A gypsum board according to the invention is waterproofed by means of at least one polysiloxane and contains magnesium oxide as catalyst for the polymerisation of the siloxane. In addition, the gypsum board comprises a gypsum crystal modifier that is effective during the production of the gypsum board during rehydration from hemihydrate to dihydrate.

The magnesium oxide can preferably be a caustic MgO. However, dead-burned MgO can also be used.

It has surprisingly been found that gypsum crystal modifiers that are effective during the re-crystallisation from hemihydrate to gypsum are able to compensate for the negative consequences of the addition of the siloxane catalyst magnesium oxide: The resistance to sagging of the gypsum boards in some cases can not only be recuperated, but even increased. The crystal modifier enhances the sag resistance of gypsum boards comprising MgO as a catalyst.

The polysiloxane is preferably a polymethylsiloxane.

The gypsum crystal modifier is preferably selected from bivalent heavy metal salts, metal silicates, borates, and mixtures thereof.

In particular, salts of heavy metals or transition metals that are easily soluble in aqueous medium (solubility at 20° C.>200 g/l water, preferably >300 g/l), for example sulfates, chlorides and salt-like hydroxides or oxides are suitable as gypsum crystal modifiers. Particularly preferred substances are copper sulfate (solubility of the anhydrous variant in water at 20° C.: 203 g/l, solubility of the pentahydrate in water at 20° C.: 317 g/l) and zinc sulfate (solubility of the monohydrate in water at 20° C.: 350 g/l, solubility of the heptahydrate in water at 20° C.: 965 g/l) or hydrates thereof. Iron salts and/or tin salts are furthermore preferred.

The metal silicates that are effective as gypsum crystal modifier can have the general formula $SiO_2:Me_2O$. These are preferably alkali silicates, in particular sodium or potassium silicates, or mixtures thereof.

The metal silicate particularly preferably has a ratio of $SiO_2:Me_2O$ between 1.0 and 4.0.

In accordance with a development of the invention the metal silicate may belong to the class of condensed silicates, in particular metasilicates.

If borates are used as gypsum crystal modifier, these can be selected preferably from metaborates, in particular $Me_2B_4O_7$, $MeB_5O_8$, $Me_2B_{10}O_{16}$, $Me_2B_8O_{13}$ with Me=alkali metal, or mixtures thereof.

The content of gypsum crystal modifier can be between 0.001 and 0.3% by weight in relation to the mass of the calcium sulfate phases capable of setting used in the production process, i.e. the mass of the used stucco. Preferred ranges are between 0.01% by weight and 0.2% by weight (limit values inclusive). The concentration preferably is at more than or equal to 0.01% by weight, particularly preferably at more than or equal to 0.05% by weight. The applied amount preferably is below or equal to 0.2% by weight, more preferably below or equal to 0.1% by weight.

The magnesium oxide used for catalysis of the siloxane formation preferably amounts to between 0.01 and 1% by weight, in relation to the mass of the calcium sulfate phases capable of setting used in the production process.

The method according to the invention for producing a waterproofed gypsum board comprises at least the following steps:

a) producing a slurry by mixing one or more calcium sulfate phases capable
of setting,
water,
siloxane,
magnesium oxide and
a gypsum crystal modifier;
b) shaping the mixture.

Apart from the above-mentioned constituents, the slurry may contain additional additives that are known to a person skilled in the art for the particular fields of application. The additives may be in particular surfactants or foam formers in general, setting accelerators, setting retarders, starches, starch ethers, plasticisers, or agents for improving the water retention as well as others.

The gypsum crystal modifier can be selected from bivalent heavy metal salts, metal silicates, borates and mixtures thereof.

In addition, the use of a mixture of magnesium oxide and a gypsum crystal modifier selected from bivalent heavy metal salts, metal silicates, borates and mixtures thereof for improving the resistance to sagging of gypsum boards, in particular in moist and warm climatic conditions, is to be protected. Gypsum boards within the scope of this invention are understood to mean: gypsum plasterboards, gypsum fibreboards, gypsum boards coated with a fibreglass mat, partition wall boards made of gypsum, and boards in which the board material consists of at least 50% by weight gypsum.

BRIEF DESCRIPTION OF THE DRAWINGS

FIG. 1 is a graphic representation of samples measuring 10 cm×67 cm cut out from gypsum plasterboards at predefined points.

DETAILED DESCRIPTION

The invention will be explained in greater detail hereinafter on the basis of an exemplary embodiment. The example is in no way considered to limit the invention.

Gypsum plasterboards were produced on an experimental conveyor line. Stucco (calcined gypsum, primarily β-hemihydrate) was processed with water, siloxane, magnesium oxide and copper pentahydrate, the gypsum crystal modifier, to form a slurry. In the present example 0.28% by weight H-siloxane (polydimethylsiloxane), 0.15% by weight MgO and 0.05% by weight copper sulfate pentahydrate, in each case in relation to the amount of stucco employed, were used; see test 3, Table 1). The slurry was processed conventionally to form gypsum plasterboard.

As comparative tests, gypsum boards were produced that basically had an identical composition to the board according to the invention. However, in test 1 (see Table 1) neither MgO nor copper sulfate pentahydrate were added. In test 2 MgO was added, but no copper sulfate pentahydrate was added. The gypsum boards differed only by the aforementioned differences.

The copper sulfate pentahydrate was dosed in liquid form, i.e. dissolved in water, and was fed continuously in the form of a solution from a storage container to the mixing process of water and stucco. This can be performed for example by means of a pump that admixes the solution indirectly into one of the liquid feed flows to the mixer or that doses the solution directly into the mixer. Metal sulfates can also be dosed as solid material in powder form into one of the solid material flows into the mixer, for example by means of a typical solid material dosing station.

In order to determine the sag of the produced gypsum plasterboards, samples measuring 10 cm×67 cm were cut out from the gypsum plasterboards at predefined points (see FIG. 1) of the construction board. Three longitudinal samples (RL=right longitudinal, ML=middle longitudinal, and LL=left longitudinal) and three transverse samples (RQ=right transverse, MQ=middle transverse, and LQ=left transverse) were taken per examined board. The samples were duplicated on a second board. The longitudinal samples were cut out from the examined boards such that their longitudinal extent ran in the direction of production of the boards. The transverse samples were cut out from the examined boards such that their longitudinal extent was arranged perpendicularly to the direction of production of the boards. In each case a sample (ML, MQ) was taken from the middle of the board, i.e. at an equal distance from the two longitudinal edges of the board, and in each case a sample (LL, LQ or RL, RQ) was taken from a region of the board arranged closer to the left or closer to the right board edge respectively.

The samples thus removed were then dried in a drying cabinet to a constant weight, standing on their longitudinal edge. Then the zero value for determining sag (starting sag) was determined by means of a precision depth gauge in the middle of the sample.

The samples were stored, supported at the edge (spacing of the supports: 60 cm) in a climatic chamber at 20+/−1° C. and 90+/−1% relative humidity for 7 days. The sag as described above was then determined again, and the absolute value was determined by subtracting the starting sag. The values of the three longitudinal samples and the values of the three transverse samples per board were averaged in each case.

TABLE 1

| | Additive | Test 1 | Test 2 | Test 3 |
|---|---|---|---|---|
| A | H-Siloxane (polymethyl hydrogen siloxane) | 0.28% | 0.28% | 0.28% |
| B | magnesium oxide | — | 0.15% | 0.15% |
| C | copper sulfate | — | — | 0.05% |
| | Ø longitudinal sag in mm | 2.72 | 4.17 | 2.94 |
| | Sample 1 | 2.72 | 3.97 | 2.99 |
| | Sample 2 | 2.65 | 4.19 | 2.8 |
| | Sample 3 | 2.59 | 4.33 | 3.03 |
| | Sample 4 | 2.75 | 4.19 | 2.92 |
| | Sample 5 | 2.81 | 4.08 | 2.95 |
| | Sample 6 | 2.81 | 4.27 | 2.95 |
| | Ø transverse sag in mm | 4.50 | 6.95 | 4.86 |
| | Sample 1 | 4.22 | 6.94 | 4.88 |
| | Sample 2 | 4.34 | 6.91 | 4.71 |
| | Sample 3 | 4.36 | 7.24 | 4.79 |
| | Sample 4 | 4.12 | 6.78 | 5.01 |
| | Sample 5 | 4.24 | 6.89 | 4.83 |
| | Sample 6 | 5.69 | 6.95 | 4.91 |

The comparison between the sample according to the invention (test 3) and the comparative samples (tests 1 and 2) revealed the following: In test 1 H-siloxane was added for waterproofing, however the polymerisation was not catalysed. In this test there was also no addition of gypsum crystal modifier. In the longitudinal direction the samples had an average sag of 2.72 mm after treatment in the climatic chamber. This value deteriorates to 4.17 mm if the siloxane polymerisation is catalysed by MgO (test 2). If a very small amount of copper sulfate pentahydrate is added, the sag improves again considerably to 2.94 mm. The same is true for the sag in the longitudinal direction.

While a particular embodiment of the improvement of the mechanical properties of waterproofed gypsum boards with polydimethylsiloxanes has been described herein, it will be appreciated by those skilled in the art that changes and modifications may be made thereto without departing from the invention in its broader aspects and as set forth in the following claims.

The invention claimed is:

1. A waterproofed gypsum board, comprising: the gypsum board is waterproofed by means of at least one polysiloxane and includes magnesium oxide as a catalyst for the polymerisation of the at least one polysiloxane; the gypsum board being formed from a gypsum slurry which includes a calcium sulfate and a gypsum crystal modifier; wherein the gypsum crystal modifier is effective during the production of the gypsum board in the rehydration from hemihydrate to dihydrate; wherein the crystal modifier enhances the sag resistance of the gypsum board; wherein the gypsum crystal modifier includes at least one bivalent heavy metal salt which is selected from a group consisting of chlorides, hydroxides, oxides or combinations thereof; and wherein the content of the gypsum crystal modifier is between 0.01 and 0.3% by weight, in relation to the mass of the calcium sulfate in the gypsum slurry.

2. The waterproofed gypsum board according to claim 1, characterised in that the polysiloxane comprises a polydimethylsiloxane.

3. The waterproofed gypsum board according to claim 1, characterised in that the at least one bivalent heavy metal salt is selected from a group consisting of copper salts, zinc salts, iron salts, tin salts and mixtures thereof.

4. The waterproofed gypsum board according to claim 1, characterised in that the gypsum crystal modifier further comprises at least one borate which is selected from $Me_2B_4O_7$, $MeB_5O_8$, $Me_2B_{10}O_{16}$, and $Me_2B_8O_{13}$, or mixtures thereof, with Me=alkali metal.

5. The waterproofed gypsum board according to claim 1, characterised in that the content of magnesium oxide is between 0.01 and 1% by weight, in relation to the mass of the calcium sulfate in the gypsum slurry.

6. The waterproofed gypsum board according to claim 1, characterised in that the at least one bivalent heavy metal salt is selected from a group consisting of hydroxides, oxides, or combinations thereof.

7. A method for producing the waterproofed gypsum board of claim 1, comprising the following steps:
   a) producing a slurry by mixing one or more calcium sulfate phases capable of setting,
      water,
      the at least one polysiloxane,
      magnesium oxide and
      a gypsum crystal modifier, wherein the crystal modifier enhances the sag resistance of the gypsum board; and
   b) shaping the mixture.

8. The method according to claim 7, characterised in that the slurry additionally contains additives, including at least one of surfactants, foam formers, setting accelerators, setting retarders, starches, starch ethers, plasticisers, or means for improving the water retention.

9. A waterproofed gypsum board, comprising: the gypsum board is waterproofed by means of at least one polysiloxane and includes magnesium oxide as a catalyst for the polymerisation of the at least one polysiloxane; the gypsum board being formed from a gypsum slurry including a calcium sulfate and a gypsum crystal modifier; wherein the gypsum crystal modifier is effective during the production of the gypsum board in the rehydration from hemihydrate to dihydrate; wherein the crystal modifier enhances the sag resistance of the gypsum board; wherein the gypsum crystal modifier includes at least one metal silicate; wherein the at least one metal silicate is a potassium silicate and belongs to the class of condensed silicates; and wherein the content of the gypsum crystal modifier is 0.3% by weight, in relation to the mass of the calcium sulfate in the gypsum slurry.

10. The waterproofed gypsum board according to claim 9, characterised in that the polysiloxane comprises a polydimethylsiloxane.

11. The waterproofed gypsum board according to claim 9, characterised in that the content of magnesium oxide is between 0.01 and 1% by weight, in relation to the mass of the calcium sulfate in the gypsum slurry.

12. The waterproofed gypsum board according to claim 9, characterised in that the gypsum crystal modifier further comprises at least one borate which is selected from $Me_2B_4O_7$, $MeB_5O_8$, $Me_2B_{10}O_{16}$, $Me_2B_8O_{13}$, and mixtures thereof with Me=alkali metal.

13. A waterproofed gypsum board, comprising: the gypsum board is waterproofed by means of at least one polysiloxane and includes magnesium oxide as a catalyst for the polymerisation of the at least one polysiloxane; the gypsum board being formed from a gypsum slurry which includes a calcium sulfate and a gypsum crystal modifier; wherein the gypsum crystal modifier is effective during the production of the gypsum board in the rehydration from hemihydrate to dihydrate; wherein the crystal modifier enhances the sag resistance of the gypsum board; wherein the gypsum crystal modifier includes copper sulfate pentahydrate; wherein the content of the polysiloxane is 0.28% by weight, in relation to the mass of the calcium sulfate in the gypsum slurry; wherein the content of the magnesium oxide is 0.15% by weight, in relation to the mass of the calcium sulfate in the gypsum slurry; wherein the content of the copper sulfate is 0.05% by weight, in relation to the mass of the calcium sulfate in the gypsum slurry.

* * * * *